United States Patent
Dodds

(10) Patent No.: US 11,165,444 B2
(45) Date of Patent: Nov. 2, 2021

(54) APPARATUS WITH A DATA SECURITY MECHANISM AND METHODS FOR OPERATING THE SAME

(71) Applicant: Micron Technology, Inc., Boise, ID (US)

(72) Inventor: Brett K. Dodds, Boise, ID (US)

(73) Assignee: Micron Technology, Inc., Boise, ID (US)

(*) Notice: Subject to any disclaimer, the term of this patent is extended or adjusted under 35 U.S.C. 154(b) by 68 days.

(21) Appl. No.: 16/684,254

(22) Filed: Nov. 14, 2019

(65) Prior Publication Data

US 2021/0152190 A1 May 20, 2021

(51) Int. Cl.
| | |
|---|---|
| *H03M 13/29* | (2006.01) |
| *H03M 13/09* | (2006.01) |
| *H03M 13/00* | (2006.01) |
| *G06F 9/00* | (2006.01) |
| *G06F 9/30* | (2018.01) |
| *H04L 9/06* | (2006.01) |
| *G06F 12/14* | (2006.01) |
| *H04L 9/08* | (2006.01) |

(52) U.S. Cl.
CPC .... *H03M 13/2942* (2013.01); *G06F 9/30134* (2013.01); *G06F 12/1408* (2013.01); *H03M 13/09* (2013.01); *H04L 9/0656* (2013.01); *H04L 9/0869* (2013.01)

(58) Field of Classification Search
CPC .............. H03M 13/2942; H03M 13/09; G06F 9/30134; G06F 12/1408; G06F 11/1012; G06F 11/1048; H04L 9/0656; H04L 9/0869; G11B 2220/60
See application file for complete search history.

(56) References Cited

U.S. PATENT DOCUMENTS

| | | | | |
|---|---|---|---|---|
| 9,129,701 | B2* | 9/2015 | Patel | G11C 29/025 |
| 9,459,955 | B2* | 10/2016 | Tuers | G06F 11/1012 |
| 9,864,654 | B2* | 1/2018 | Vishne | G06F 11/1076 |
| 2012/0198144 | A1* | 8/2012 | Johnson | G11C 7/1045 |
| | | | | 711/105 |
| 2013/0315397 | A1* | 11/2013 | Tuers | G06F 11/1012 |
| | | | | 380/287 |
| 2020/0042745 | A1* | 2/2020 | Wallach | G06F 9/3016 |
| 2020/0089625 | A1* | 3/2020 | Wallach | G06F 12/1475 |

* cited by examiner

*Primary Examiner* — Justin R Knapp
(74) *Attorney, Agent, or Firm* — Perkins Coie LLP

(57) ABSTRACT

Methods, apparatuses, and systems related to a data storage are described. Data targeted for storage is communicated to a memory device along with a scramble key. The scramble key is used to encode the target data, and the encoded data is stored at the memory device. For read operations, the encoded data is provided instead of the target data, and the target data is recovered outside of the memory device according to the scramble key.

25 Claims, 4 Drawing Sheets

APPARATUS WITH A DATA SECURITY MECHANISM AND METHODS FOR OPERATING THE SAME

TECHNICAL FIELD

The disclosed embodiments relate to apparatus, and, in particular, to apparatus with a data security mechanism and methods for operating the same.

BACKGROUND

An apparatus (e.g., a processor, a memory system, and/or other electronic apparatus) can include one or more semiconductor circuits configured to store and/or process information. For example, the apparatus can include a memory device, such as a volatile memory device, a non-volatile memory device, or a combination device. Memory devices, such as dynamic random-access memory (DRAM), can utilize electrical energy to store and access data. Accordingly, a system including a host (e.g., one or more processors and/or an operating system) can write data to and/or read stored data from the memory devices.

DETAILED DESCRIPTION

Figure 1:
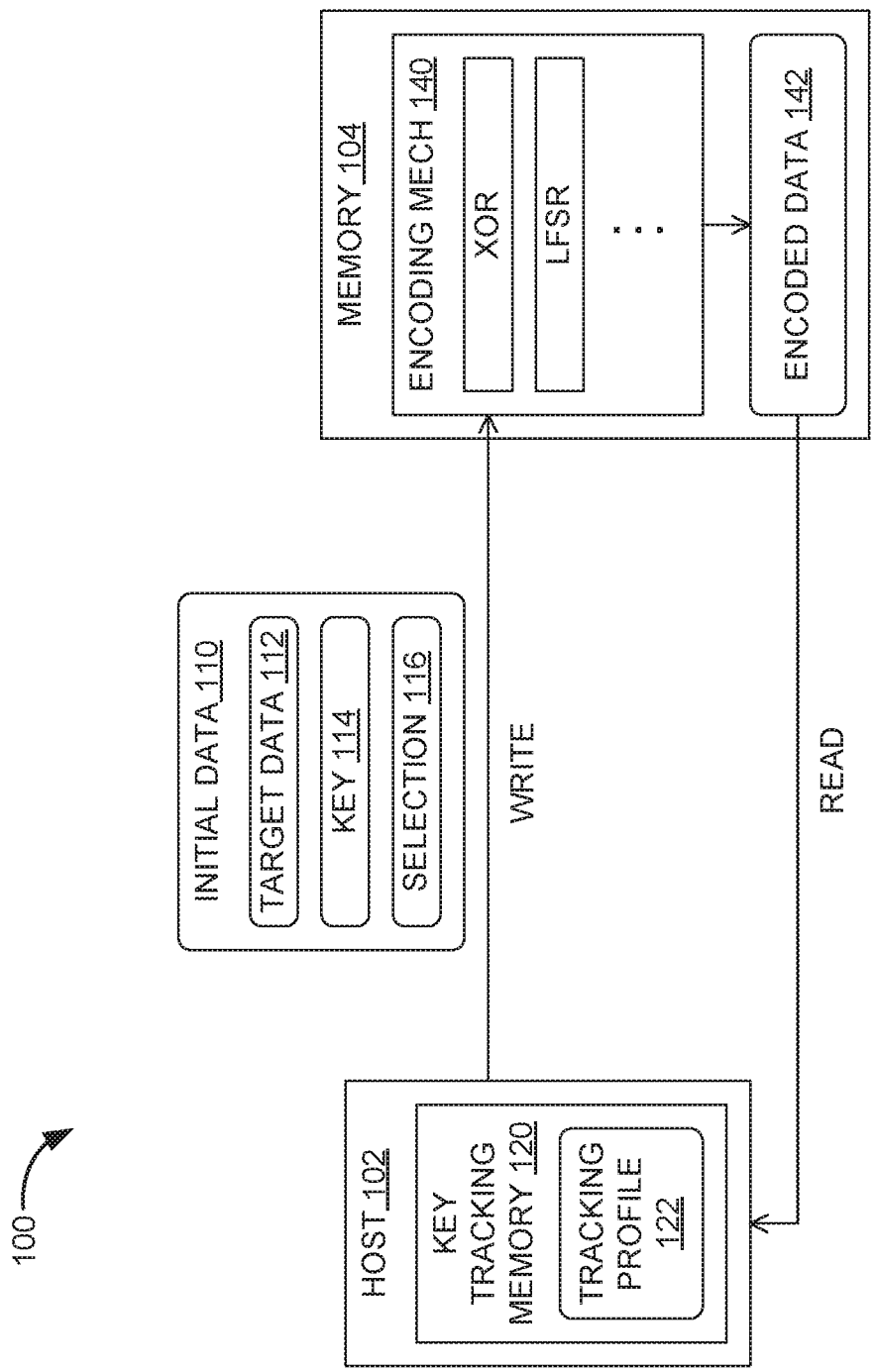
FIG. 1 is a block diagram of an apparatus in accordance with an embodiment of the present technology.

As described in greater detail below, the technology disclosed herein relates to an apparatus, such as for computing systems, memory systems, systems with memory devices, related methods, etc., for securing stored data. The apparatus (e.g., a memory device and/or a system including the memory device) can receive initial data from a host, such as a processor, a memory controller, and/or an operating system implemented thereon. In some embodiments, the initial data (e.g., write burst) can include a scramble key at a predetermined portion therein (e.g., at a beginning portion and/or an end portion of the write burst). The apparatus can use an encoding mechanism therein, such as a circuit configured to scramble, reorder, and/or change the target data according to a predetermined equation and/or process, to generate encoded data based on the received initial data. In some embodiments, the encoding mechanism can include an exclusive OR (XOR) and/or a linear feedback shift register (LFSR) used to encode or change target write data within the initial data according to the scramble key. Accordingly, the memory device can generate and store the encoded data instead of the initially received target data. In some embodiments, the memory device can discard (e.g., not store and/or erase) the scramble key after generating the encoded data.

Subsequently, upon receiving a read command for the initial data, the memory device can provide the encoded data instead of the initial target data. The host can track the corresponding scramble key for the original target data (e.g., according to predetermined pattern corresponding data storage locations) with after sending the initial data. Upon receiving the encoded data from the memory device, the host can decode the encoded data using the scramble key to recover and read the original target data.

Until recently, nefarious activities (e.g., hacking, snooping, etc.) occurred at levels above the hardware layers. For example, hackers attempt to gain unauthorized access to data stored in the address via software-based methods, such as by duplicating/stealing passwords, using software tools (e.g., computer worms), etc. However, recently-discovered activities utilize lower-level (e.g., at device/component levels) interactions to gain unauthorized access to the apparatus/data. For example, some snooping devices coupled to the apparatus may be configured to listen to the data exchanged between the host and the memory device. Also, some nefarious devices/applications may be configured to send commands and/or access information from memory devices when the corresponding host is silent (e.g., in sleep states).

As described in further detail below, embodiments of the present technology provide additional protection against such nefarious activities by encoding the data at one end, such as outside of the host and/or at the memory device. Accordingly, the initial write data sent from the host to the memory device and the read data returned from the memory to the host can be different. Thus, snooping devices/applications that may gain unauthorized access to data stored in the memory devices will still be unable to recover the initial target data due to the encoding. Moreover, nefarious devices, applications, and/or parties will be unable to match written data to read data, thereby disrupting any unauthorized detection of patterns or reverse-engineering.

FIG. 1 is a block diagram of an apparatus 100 in accordance with an embodiment of the present technology. The apparatus 100 (e.g., a computing device/system, a memory system, and/or other semiconductor-based digital apparatus) can include a host 102 interacting with one or more memory devices 104. Some examples of the host 102 can include a processor, a central processing unit (CPU), a co-processor, a system-on-chip, a dedicated memory controller, other controlling circuits, or a combination thereof. Further, the host 102 can include software, such as an operating system, implemented via the processor, the CPU, etc.

During operation of the apparatus 100, the host 102 can interact with the memory device 104 to store and/or access data. The memory device 104 can include volatile, non-volatile (NV), and/or hybrid memory devices. Some examples of the memory device 104 can include cache memory, RAM (e.g., DRAM, NV RAM, etc.), magnetic data storage devices, and/or Flash devices.

As an illustrative example, the host 102 can write data by sending initial data 110 (e.g., a write burst data) to the memory device 104. The initial data 110 can include target data 112 intended for storage and/or subsequent access via a read command. The target data 112 can correspond to an address that the host 102 can utilize to subsequent read operations associated with the target data 112. In some embodiments, the initial data 110 can include one or more scramble keys 114 and/or encoding selection 116 associated with encryption of the target data 112. In some embodiments, the scramble keys 114 can include one or more digital bit values configured to be utilized in encrypting the target data 112. In some embodiments, the encoding selection 116 can include a selection value or an address configured to identify one of multiple available encryption schemes/circuits.

The host 102 can include and/or utilize key tracking memory 120 to maintain/update a tracking profile 122. In some embodiments, the key tracking memory 120 include memory local to the host 102 (e.g., cache memory) or at an external memory device (e.g., DRAM). In some embodiments, the key tracking memory 120 can be implemented as virtual memory accessible to the host 102. In some embodiments, the tracking memory 120 can be separate/different from the memory device 104. The tracking profile 122 can include a mechanism for generating and/or tracking the scramble keys 114 according to the corresponding target data 112. In some embodiments, the host 102 can dynamically generate the scramble keys 114, such as via random number generators, so that each process can secure the corresponding memory differently. In some embodiments, the tracking profile 122 can be based on regions within the memory. For example, the tracking profile 122 can be a look up table linking unique scramble keys 114 to the predetermined regions. The host 102 can be configured to control/issue a unique key for each of the predetermined memory regions. In some embodiments, the tracking profile 122 can generate, select, and/or assign the scramble keys 114 for specific memory regions and/or addresses in real-time. The host 102 can store the scramble keys 114 and the corresponding assignments in the key tracking memory 120. The host 102 can maintain the tracking profile 122 and track the scramble keys 114 according to process identifiers associated with or triggering the write operation and/or the memory addresses. The host 102 can similarly track the encoding selection 116 as described above.

The initial data 110 can be received by the memory device 104. The memory device 104 can include an encoding mechanism 140 configured to generate encoded data 142 based on changing/encrypting the target data 112. In some embodiments, the encoding mechanism 140 can include circuitry configured to change or rearrange input data according to one or more predetermined encoding schemes. For example, the encoding mechanism 140 can include an XOR-based circuit and/or an LFSR-based circuit configured to generate the encoded data 142 based on encrypting the target data 112 according to the scramble key 114. The memory device 104 can store the generated encoded data 142 instead of the target data 112 and discard (e.g., not save and/or erase) the target data 112 and/or the scramble key 114.

In some embodiments, the memory device 104 can include the encoding mechanism 140 configured to implement multiple different encoding schemes. The encoding mechanism 140 can be configured to select and implement one of the encoding schemes according to the encoding selection 116. For example, the encoding mechanism 140 can be configured to encode based on an XOR scheme or an LFSR scheme. The host 102 (e.g., a mode register set (MRS) therein) can select and specify one of the available encoding schemes, such as the XOR scheme, via the encoding selection 116. Accordingly, the memory device 104 can receive the encoding selection 116 (via, e.g., the initial data 110) from the host 102. The memory device 104 and/or the encoding mechanism 140 can select and implement the encoding scheme that corresponds to the encoding selection 116. In some embodiments, the encoding scheme can be predetermined for each memory region. In other embodiments, a predetermined encoding scheme can be implemented across all regions of the memory device 104.

In some embodiments, as an illustrative example, the host 102 can send the scramble key 114 with each write burst (e.g., the initial data 110). The scramble key 114 can be used to modify the data (e.g., the target data 112) written to the memory device 104. Upon receipt of the data and the scramble key 114, the memory device 104 can generate the encoded data 142 based on modifying the target data 112 according to the scramble key 114 and the encoding mechanism 140. In response to reads, the memory device 104 can send the encoded data 142 (instead of the target data 112) back to the host 102, and the host 102 can decode the encoded data 142 to recover the target data 112. Thus, the host 102 and/or the memory device 104 provide can secure the data within the memory device 104 with reduced complexity, such as in comparison to conventional key guards. Moreover, the encoding mechanism 140, returning the encoded data 142, and/or decoding the encoded data 142 at the host 102 provides control to system builders and/or the operating system to customize protection of memory contents.

In some embodiments, the encoding mechanism 140 can be implemented separate from and/or in addition to other conventional data manipulation, such as cyclic redundancy check (CRC) mechanisms. For example, since conventional CRC mechanisms do not alter the information stored in memory, the CRC mechanisms can be implemented before the encoding mechanism 140 (e.g., before storing in the memory device 104) and/or after decoding (e.g., after recovering the target data 112 at the host 102). The target data 112 may include the CRC data, and the memory device 104 can generate the encoded data 142 based on encoding the target data 112 having the CRC data therein. In some embodiments, the encoding mechanism 140 can be implemented in addition to any error correction code (ECC) implementation. For example, in systems that utilize ECC (e.g., NAND applications), the encoding mechanism 140 can be implemented before the ECC engine. In other words, the data can be corrected via ECC and then encoded before storage, and the data can be decoded first and then corrected for reads. In other embodiments, the encoding mechanism 140 can be implemented after the ECC engine.

Figure 2:
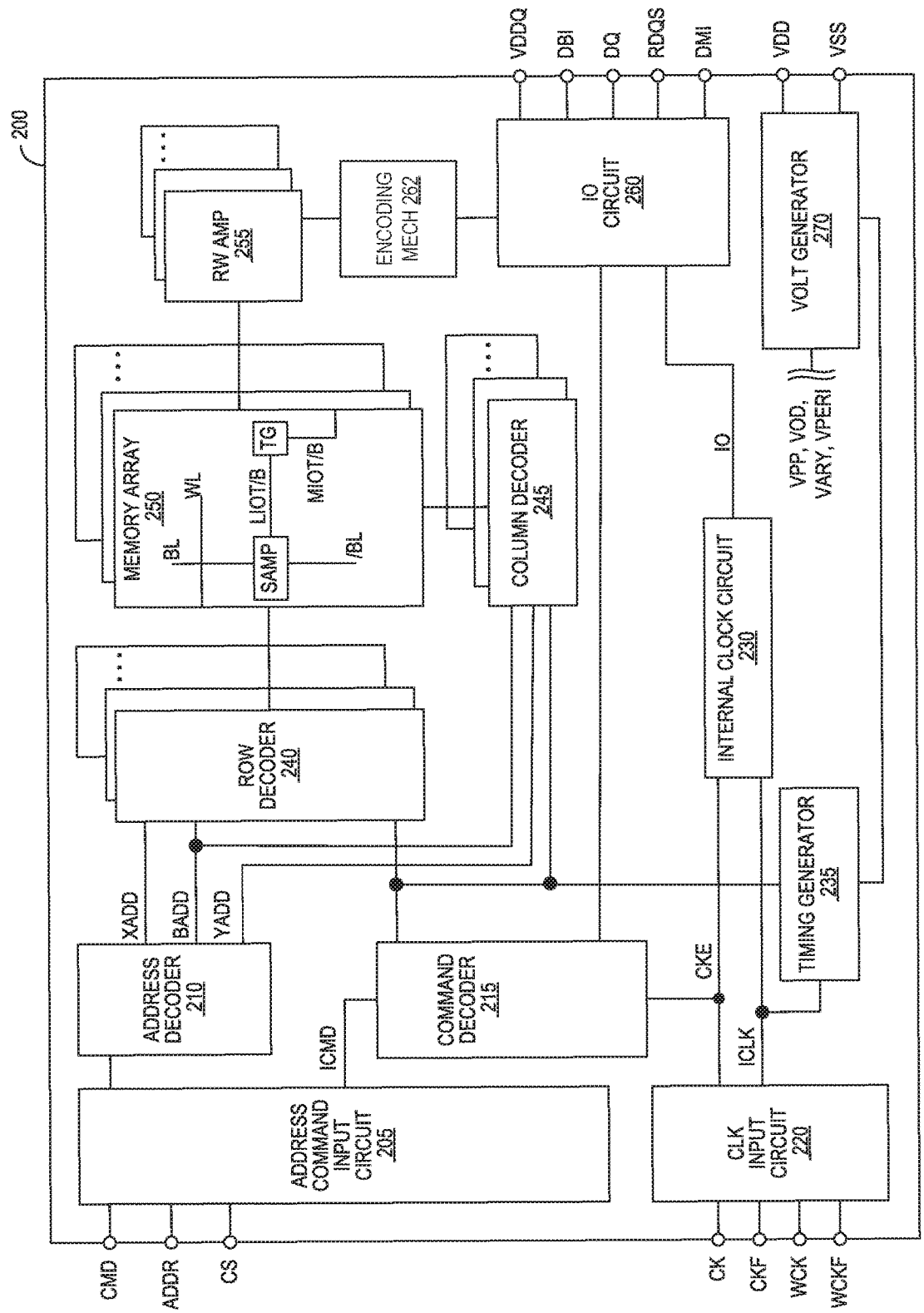
FIG. 2 is a block diagram of a further apparatus in accordance with an embodiment of the present technology.

FIG. 2 is a block diagram of an apparatus 200 (e.g., a semiconductor die assembly, including a three-dimensional integration (3DI) device or a die-stacked package) in accordance with an embodiment of the present technology. For example, the apparatus 200 can include the memory device 104 of FIG. 1, such as a DRAM or a portion thereof that includes one or more dies/chips.

The apparatus 200 may include an array of memory cells, such as memory array 250. The memory array 250 may include a plurality of banks (e.g., banks 0-15), and each bank may include a plurality of word-lines (WL), a plurality of bit lines (BL), and a plurality of memory cells arranged at intersections of the word-lines and the bit lines. Memory cells can include any one of a number of different memory media types, including capacitive, magnetoresistive, ferroelectric, phase change, or the like. The selection of a word-line WL may be performed by a row decoder 240, and the selection of a bit line BL may be performed by a column decoder 245. Sense amplifiers (SAMP) may be provided for corresponding bit lines BL and connected to at least one respective local I/O line pair (LIOT/B), which may in turn be coupled to at least respective one main I/O line pair (MIOT/B), via transfer gates (TG), which can function as switches. The sense amplifiers and transfer gates may be operated based on control signals from decoder circuitry, which may include the command decoder 215, the row decoders 240, the column decoders 245, any control circuitry of the memory array 250, or any combination thereof. The memory array 250 may also include plate lines and corresponding circuitry for managing their operation.

The apparatus 200 may employ a plurality of external terminals that include command and address terminals coupled to a command bus and an address bus to receive command signals (CMD) and address signals (ADDR), respectively. The apparatus 200 may further include a chip select terminal to receive a chip select signal (CS), clock terminals to receive clock signals CK and CKF, data clock terminals to receive data clock signals WCK and WCKF, data terminals DQ, RDQS, DBI, and DMI, power supply terminals VDD, VSS, and VDDQ.

The command terminals and address terminals may be supplied with an address signal and a bank address signal (not shown in FIG. 2) from outside. The address signal and the bank address signal supplied to the address terminals can be transferred, via a command/address input circuit 205, to an address decoder 210. The address decoder 210 can receive the address signals and supply a decoded row address signal (XADD) to the row decoder 240, and a decoded column address signal (YADD) to the column decoder 245. The address decoder 210 can also receive the bank address signal and supply the bank address signal to both the row decoder 240 and the column decoder 245.

The command and address terminals may be supplied with command signals (CMD), address signals (ADDR), and chip select signals (CS), from a memory controller and/or a nefarious chipset. The command signals may represent various memory commands from the memory controller (e.g., including access commands, which can include read commands and write commands). The chip select signal may be used to select the apparatus 200 to respond to commands and addresses provided to the command and address terminals. When an active chip select signal is provided to the apparatus 200, the commands and addresses can be decoded, and memory operations can be performed. The command signals may be provided as internal command signals ICMD to a command decoder 215 via the command/address input circuit 205. The command decoder 215 may include circuits to decode the internal command signals ICMD to generate various internal signals and commands for performing memory operations, for example, a row command signal to select a word-line and a column command signal to select a bit line. The command decoder 215 may further include one or more registers for tracking various counts or values (e.g., counts of refresh commands received by the apparatus 200 or self-refresh operations performed by the apparatus 200).

Read data can be read from memory cells in the memory array 250 designated by row address (e.g., address provided with an active command) and column address (e.g., address provided with the read). The read command may be received by the command decoder 215, which can provide internal commands to input/output circuit 260 so that read data can be output from the data terminals DQ, RDQS, DBI, and DMI via read/write amplifiers 255 and the input/output circuit 260 according to the RDQS clock signals. The read data may be provided at a time defined by read latency information RL that can be programmed in the apparatus 200, for example, in a mode register (not shown in FIG. 2). The read latency information RL can be defined in terms of clock cycles of the CK clock signal. For example, the read latency information RL can be a number of clock cycles of the CK signal after the read command is received by the apparatus 200 when the associated read data is provided.

Write data can be supplied to the data terminals DQ, DBI, and DMI according to the WCK and WCKF clock signals. The write command may be received by the command decoder 215, which can provide internal commands to the input/output circuit 260 so that the write data can be received by data receivers in the input/output circuit 260 and supplied via the input/output circuit 260 and the read/write amplifiers 255 to the memory array 250. The write data may be written in the memory cell designated by the row address and the column address. The write data may be provided to the data terminals at a time that is defined by write latency WL information. The write latency WL information can be programmed in the apparatus 200, for example, in the mode register. The write latency WL information can be defined in terms of clock cycles of the CK clock signal. For example, the write latency information WL can be a number of clock cycles of the CK signal after the write command is received by the apparatus 200 when the associated write data is received.

In some embodiments, the apparatus 200 can include an encoding mechanism 262 (e.g., the encoding mechanism 140 of FIG. 1). The encoding mechanism 262 can include circuitry configured to encode the write data (e.g., the target data 112 of FIG. 1). For example, the encoding mechanism 262 can include XOR, LFSR, and/or other circuitry that can update or change the values of the write data. Accordingly, the encoding mechanism 262 can generate the encoded data 142 of FIG. 1 for storage instead of the originally received write data. In some embodiments, the encoding mechanism 262 can change the write data according to other data (e.g., the scramble key 114). In some embodiments, the encoding mechanism 262 can be configured to select and implement one or multiple encoding schemes/circuits according to a further input/command (e.g., the encoding selection 116 of FIG. 1).

For illustrative purposes, the encoding mechanism 262 is shown separate from and between the read/write amplifiers 255 and the input/output circuit 260. However, it is understood that the encoding mechanism 262 can be configured differently. For example, the encoding mechanism 262 can be integrated or included within the read/write amplifiers 255 and/or the input/output circuit 260.

The power supply terminals may be supplied with power supply potentials $V_{DD}$ and $V_{SS}$. These power supply potentials $V_{DD}$ and $V_{SS}$ can be supplied to an internal voltage generator circuit 270. The internal voltage generator circuit 270 can generate various internal potentials $V_{PP}$, $V_{OD}$, $V_{ARY}$, $V_{PERI}$, and the like based on the power supply potentials $V_{DD}$ and $V_{SS}$. The internal potential $V_{PP}$ can be used in the row decoder 240, the internal potentials $V_{OD}$ and $V_{ARY}$ can be used in the sense amplifiers included in the memory array 250, and the internal potential $V_{PERI}$ can be used in many other circuit blocks.

The power supply terminal may also be supplied with power supply potential $V_{DDQ}$. The power supply potential $V_{DDQ}$ can be supplied to the input/output circuit 260 together with the power supply potential VSS. The power supply potential $V_{DDQ}$ can be the same potential as the power supply potential $V_{SS}$ in an embodiment of the present technology. The power supply potential $V_{DDQ}$ can be a different potential from the power supply potential $V_{DD}$ in another embodiment of the present technology. However, the dedicated power supply potential $V_{DDQ}$ can be used for the input/output circuit 260 so that power supply noise generated by the input/output circuit 260 does not propagate to the other circuit blocks.

The clock terminals and data clock terminals may be supplied with external clock signals and complementary external clock signals. The external clock signals CK, CKF, WCK, WCKF can be supplied to a clock input circuit 220. The CK and CKF signals can be complementary, and the WCK and WCKF signals can also be complementary. Complementary clock signals can have opposite clock levels and transition between the opposite clock levels at the same time. For example, when a clock signal is at a low clock level a complementary clock signal is at a high level, and when the clock signal is at a high clock level the complementary clock signal is at a low clock level. Moreover, when the clock signal transitions from the low clock level to the high clock level the complementary clock signal transitions from the high clock level to the low clock level, and when the clock signal transitions from the high clock level to the low clock level the complementary clock signal transitions from the low clock level to the high clock level.

Input buffers included in the clock input circuit 220 can receive the external clock signals. For example, when enabled by a clock/enable signal from the command decoder 215, an input buffer can receive the clock/enable signals. The clock input circuit 220 can receive the external clock signals to generate internal clock signals ICLK. The internal clock signals ICLK can be supplied to an internal clock circuit 230. The internal clock circuit 230 can provide various phase and frequency controlled internal clock signals based on the received internal clock signals ICLK and a clock enable (not shown in FIG. 2) from the command/address input circuit 205. For example, the internal clock circuit 230 can include a clock path (not shown in FIG. 2) that receives the internal clock signal ICLK and provides various clock signals to the command decoder 215. The internal clock circuit 230 can further provide input/output (IO) clock signals. The IO clock signals can be supplied to the input/output circuit 260 and can be used as timing signals for determining output timing of read data and/or input timing of write data. The IO clock signals can be provided at multiple clock frequencies so that data can be output from and input to the apparatus 200 at different data rates. A higher clock frequency may be desirable when high memory speed is desired. A lower clock frequency may be desirable when lower power consumption is desired. The internal clock signals ICLK can also be supplied to a timing generator 235 and thus various internal clock signals can be generated.

The apparatus 200 can be connected to any one of a number of electronic devices capable of utilizing memory for the temporary or persistent storage of information, or a component thereof. For example, a host device (e.g., the host 102) of apparatus 200 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device may be a networking device (e.g., a switch, a router, etc.) or a recorder of digital images, audio and/or video, a vehicle, an appliance, a toy, or any one of a number of other products. In one embodiment, the host device may be connected directly to apparatus 200; although in other embodiments, the host device may be indirectly connected to memory device (e.g., over a networked connection or through intermediary devices).

Figure 3:
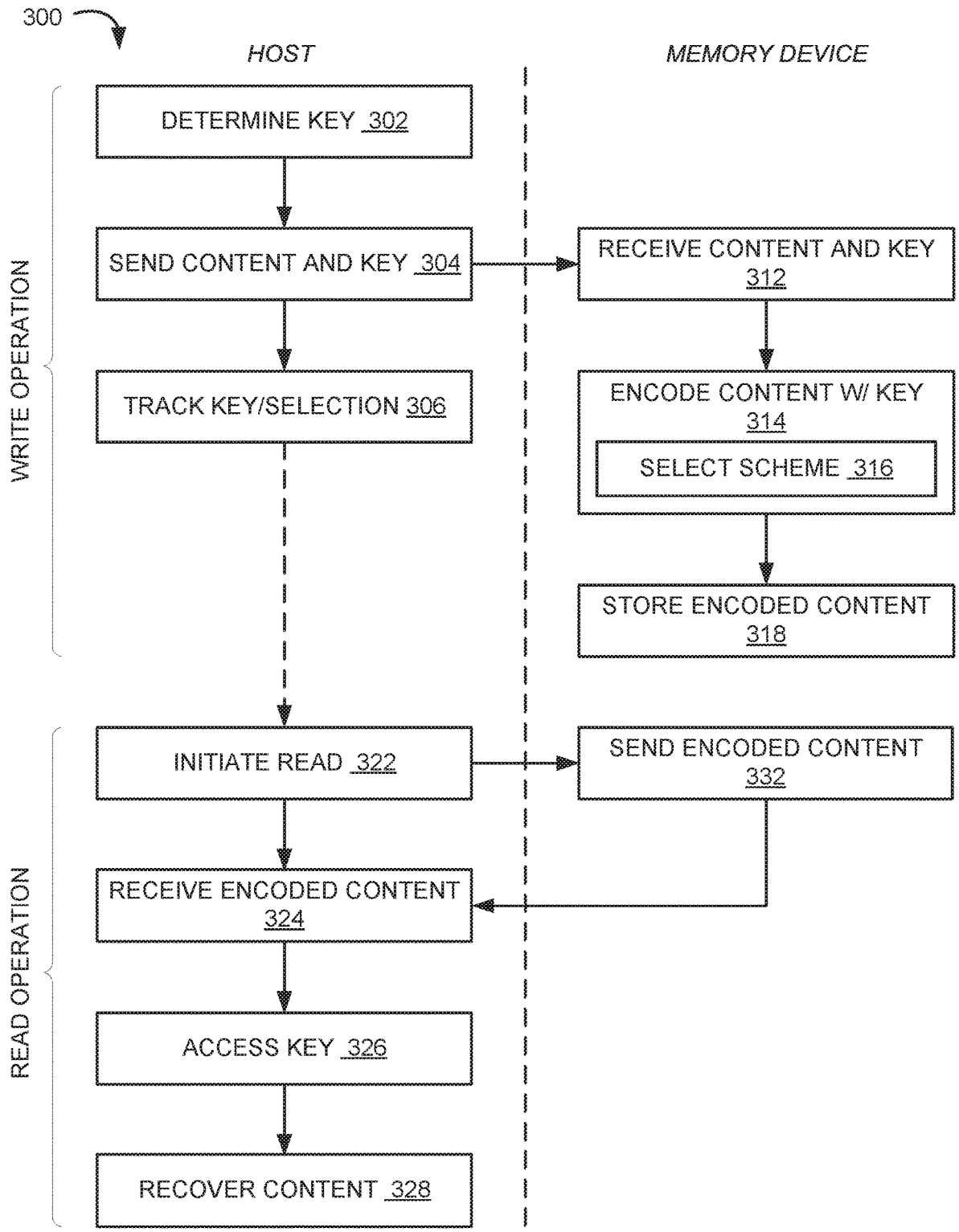
FIG. 3 is a flow diagram illustrating an example method of operating an apparatus in accordance with an embodiment of the present technology.

FIG. 3 is a flow diagram illustrating an example method 300 of operating an apparatus (e.g., the apparatus 100 of FIG. 1 and/or the apparatus 200 of FIG. 2) in accordance with an embodiment of the present technology. The method 300 can be for securing data written to/stored at the memory device 104 of FIG. 1. The method 300 can include encrypting write content data at the memory device 104 and providing the encrypted content in response to a read command. The encrypted content can be decoded at the host 102 of FIG. 1.

At block 302, the host 102 can determine the scramble key 114 of FIG. 1 for a write operation for storing content (e.g., the target data 112 of FIG. 1) at the memory device 104. In some embodiments, the host 102 can dynamically generate the scramble key 114, such as according to a predetermined process and/or via a random number generator. In some embodiments, the host 102 can determine the scramble key 114 using a look up table that includes predetermined key values for each memory regions. The host device 102 can determine the scramble key 114 as the predetermined key value corresponding to the region including the write address (e.g., logical address) and/or the initiating process.

At block 304, the host 102 can send the content and the key (e.g., the initial data 110 of FIG. 1 and/or write burst data) to the memory device 104 for the write operation. In some embodiments, the host 102 can further track the key for the written content as illustrated at block 306. For example, the host 102 can track the scramble key 114 corresponding to the target data 112 based on storing the scramble key 114 according to the initiating process and/or the write address. In some embodiments, the look up table can correspond to the tracking profile 122 of FIG. 1, thus tracking the scramble key 114 according to a memory region corresponding to the write operation. In some embodiments, the host 102 can similarly track the encoding selection 116.

At block 312, the memory device 104 can receive the content and the key sent by the host 102. For example, the memory device 104 can receive the initial data 110, including the target data 112, the scramble key 114, and/or the encoding selection 116 of FIG. 1 therein, via one or more data pads and/or the input/output circuit 260. In some embodiments, the memory device 104 can receive the initial data 110 that corresponds to the write burst/operation for writing and storing the content (e.g., the target data 112).

At block 314, the memory device 104 can encode the content with the key. For example, the memory device 104 can use the encoding mechanism 140 of FIG. 1 to generate the encoding data 142 of FIG. 1 based on encoding the target data 112 according to the scramble key 114. In some embodiments, as an example, the encoding mechanism 140 can be configured to implement an XOR encoding scheme, an LFSR encoding scheme, and/or another relatively fast encoding scheme (i.e., with respect to durations associated with the write operations). In some embodiments, as illustrated at block 314, the memory device 104 (e.g., the encoding mechanism 140) can select one of multiple encoding schemes according to the encoding selection 116. The memory device 104 can generate the encoded data 142 based on implementing the selected encoding scheme. After generating the encoded data 142, the memory device 104 (e.g., the encoding mechanism 140 therein) can discard the target data 112, the scramble key 114, and/or the encoding selection 116.

In some embodiments, the encoding mechanism 140 and/or one encoding scheme can be applied throughout the memory device 104. In other embodiments, each encoding mechanism 140 or encoding scheme can be coupled to one or more predetermined memory regions (e.g., packages, dies, banks, and/or address groupings) in the memory device 104.

At block 318, the memory device 104 can store the encoded content. For example, the memory device 104 can store the encoded data 142 in a memory array (e.g., the memory array 250 of FIG. 2) therein. The memory device 104 can store the encoded data 142 at the end of the write operation instead of the original target data 112 that corresponds to the write operation/burst.

The stored content data can be accessed at a later time via a read operation. At block 322, the host 102 can initiate a read operation, such as by sending a read command and/or a corresponding address to the memory device 104, to access the target data 112. At block 332, the memory device 104 can implement the read operation by sending the encoded content. For example, the memory device 104 can access the encoded data 142 according to the read command and/or the associated address corresponding to the target data 112. Thus, in implementing the read operation corresponding to the target data 11, the memory device 104 can provide the accessed encoded data 142 instead of the target data 112 to the host device 102.

At block 324, the host 102 can receive the encoded content (e.g., the encoded data 142) from the memory device 104 for the read operation. At block 326, the host 102 can access the key (e.g., the scramble key 114) that corresponds to the target data 112. The host 102 can access the scramble key 114 and/or the encoding selection 116 using the tracking profile 122. For example, the host 102 can re-identify the scramble key 114 according to the address (e.g., the memory region) associated with the written content using the look up table. Also, the host 102 can access the tracking profile 122 according to the process identifier and/or the address to retrieve the scramble key 114. In some embodiments, the host 102 can similarly access/retrieve the encoding selection 116 associated with the target data 112/encoded content.

At block 328, the host 102 can recover the content based on decoding the encoded data 142 with the tracked scramble key 114. The host 102 can decode the encoded data 142 based on a predetermined routine and/or circuitry that corresponds to or complements the encoding mechanism 140. The host 102 can use the encoded data 142 and the tracked scramble key 114 as inputs for the predetermined routine/circuitry to recover the target data 112. In some embodiments, the host 102 can use the tracked encoding selection 116 to select the decoding scheme before inputting the encoded data 142 and the tracked scramble key 114.

Based on encoding the target data 112 at one end (e.g., at the memory device 104) and decoding at another end (e.g., at the host 102), the apparatus can provide increased and customizable data security. Since only authorized devices/processes will know the scramble key 114 and the encoding/decoding scheme, nefarious devices/process will be unable to decode and access the stored data. Further, the differences in the sent write data and the returned read data will further increase difficulties in reverse-engineering the security mechanism. Moreover, the scramble key 114 and/or the encoding selection 116 can enable system builders/designers to customize the data security with minimal costs.

Figure 4:
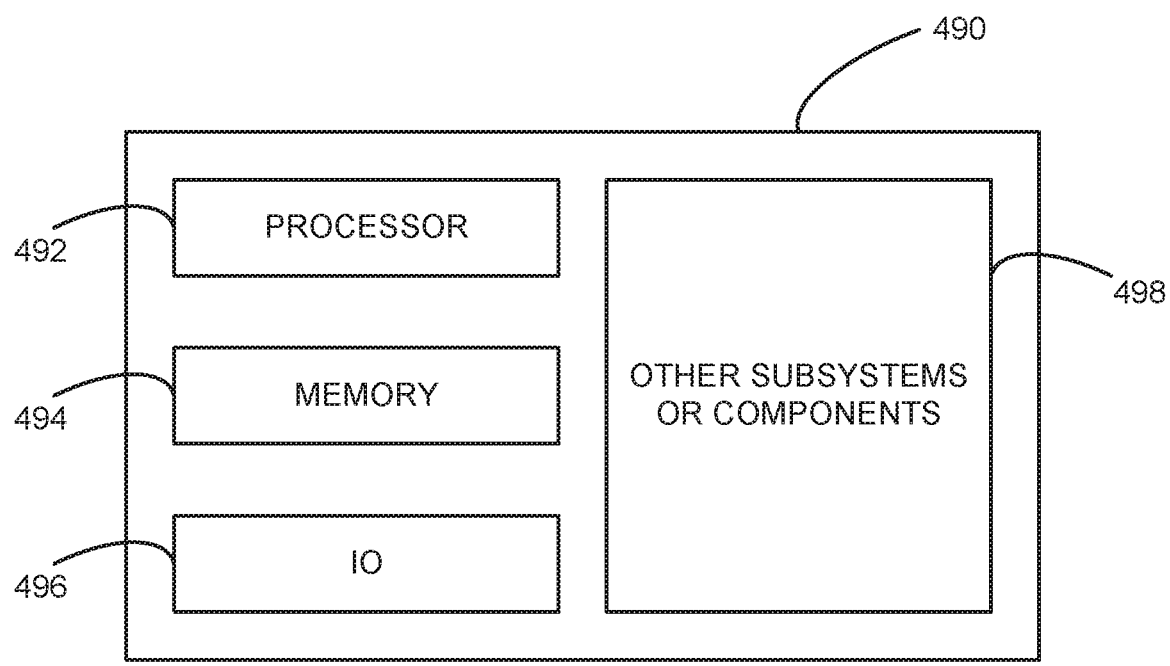
FIG. 4 is a schematic view of a system that includes an apparatus in accordance with an embodiment of the present technology.

FIG. 4 is a schematic view of a system that includes an apparatus in accordance with embodiments of the present technology. Any one of the foregoing apparatuses (e.g., memory devices) described above with reference to FIGS. 1-3 can be incorporated into any of a myriad of larger and/or more complex systems, a representative example of which is system 480 shown schematically in FIG. 4. The system 480 can include a memory device 400, a power source 482, a driver 484, a processor 486, and/or other subsystems or components 488. The memory device 400 can include features generally similar to those of the apparatus described above with reference to FIGS. 1-3, and can therefore include various features for performing a direct read request from a host device. The resulting system 480 can perform any of a wide variety of functions, such as memory storage, data processing, and/or other suitable functions. Accordingly, representative systems 480 can include, without limitation, hand-held devices (e.g., mobile phones, tablets, digital readers, and digital audio players), computers, vehicles, appliances and other products. Components of the system 480 may be housed in a single unit or distributed over multiple, interconnected units (e.g., through a communications network). The components of the system 480 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

In the illustrated embodiments above, the apparatuses have been described in the context of DRAM devices. Apparatuses configured in accordance with other embodiments of the present technology, however, can include other types of suitable storage media in addition to or in lieu of DRAM devices, such as, devices incorporating NAND-based or NOR-based non-volatile storage media (e.g., NAND flash), magnetic storage media, phase-change storage media, ferroelectric storage media, etc.

The term "processing" as used herein includes manipulating signals and data, such as writing or programming, reading, erasing, refreshing, adjusting or changing values, calculating results, executing instructions, assembling, transferring, and/or manipulating data structures. The term data structure includes information arranged as bits, words or code-words, blocks, files, input data, system-generated data, such as calculated or generated data, and program data. Further, the term "dynamic" as used herein describes processes, functions, actions or implementation occurring during operation, usage or deployment of a corresponding device, system or embodiment, and after or while running manufacturer's or third-party firmware. The dynamically occurring processes, functions, actions or implementations can occur after or subsequent to design, manufacture, and initial testing, setup or configuration.

The above embodiments are described in sufficient detail to enable those skilled in the art to make and use the embodiments. A person skilled in the relevant art, however, will understand that the technology may have additional embodiments and that the technology may be practiced without several of the details of the embodiments described above with reference to FIGS. 1-4.

I claim:
1. An apparatus, comprising:
at least one data pad configured to receive initial data provided by a host through a controller, the initial data including target data and a scramble key;
an encoding mechanism coupled to the at least one data pad and configured to generate encoded data based on encoding the received target data according to the received scramble key; and a memory array including a plurality of memory cells, the memory array coupled to the encoding mechanism and configured to store the encoded data, wherein the at least one data pad, the encoding mechanism, and the memory array comprises a memory device configured to interface with the controller and store data for the host.

2. The apparatus of claim 1, wherein:

the at least one data pad is configured to receive the initial data comprising a write burst for writing the target data; and the memory array is configured to store the encoded data instead of the target data corresponding to the write burst.

3. The apparatus of claim 1, wherein:

the memory array is configured to provide the encoded data for a read operation corresponding to the target data; and the at least one data pad is configured to send the encoded data for the read operation.

4. The apparatus of claim 1, wherein the encoding mechanism is configured to generate the encoded data based on utilizing an exclusive OR (XOR) encoding scheme according to the scramble key.

5. The apparatus of claim 1, wherein the encoding mechanism is configured to generate the encoded data based on utilizing a linear feedback shift register (LFSR) encoding scheme according to the scramble key.

6. The apparatus of claim 1, wherein the encoding mechanism is configured to generate the encoded data based on a memory region designated for storing the encoded data.

7. The apparatus of claim 1, wherein the encoding mechanism is configured to discard the target data and the scramble key after generating the encoded data.

8. The apparatus of claim 1, wherein the apparatus comprises a memory device.

9. The apparatus of claim 8, wherein the memory device is dynamic random-access memory (DRAM).

10. An apparatus, comprising:

at least one data pad configured to receive initial data provided by a host through a controller, the initial data including target data, a scramble key, and an encoding selection;

an encoding mechanism coupled to the at least one data pad and configured to select one of multiple encoding schemes corresponding to the encoding selection, and generate encoded data based on encoding the received target data according to the received scramble key; and a memory array including a plurality of memory cells, the memory array coupled to the encoding mechanism and configured to store the encoded data.

11. A method of operating a memory, the method comprising:

receiving at the memory initial data provided by a host through a controller, the initial data including target data and a scramble key;

generating encoded data at the memory based on encoding the received target data according to the received scramble key; and storing the encoded data.

12. The method of claim 11, wherein:

the initial data corresponds to a write burst for writing the target data; and storing the encoded data includes storing the encoded data instead of the target data corresponding to the write burst.

13. The method of claim 11, further comprising implementing a read operation corresponding to the target data by providing the encoded data.

14. The method of claim 11, wherein generating the encoded data includes encoding the target data based on an exclusive OR (XOR) encoding scheme.

15. The method of claim 11, wherein generating the encoded data includes encoding the target data based on a linear feedback shift register (LFSR) encoding scheme.

16. The method of claim 11, wherein:

the initial data includes an encoding selection; and generating the encoded data includes:

selecting one of multiple encoding schemes corresponding to the encoding selection, and encoding the target data according to the selected encoding scheme.

17. The method of claim 11, further comprising discarding the target data and the scramble key after generating the encoded data.

18. The method of claim 11, wherein:

the target data includes cyclic redundancy check (CRC) data; and generating the encoded data includes encoding the target data having the CRC data therein.

19. The method of claim 11, wherein generating the encoded data includes encoding the target data before implementing error correction.

20. A method of operating an apparatus, the method comprising:

receiving initial data including target data and a scramble key from a host generating encoded data based on encoding the received target data according to the received scramble key, wherein generating the encoded data includes encoding the target data based on a memory region designated for storing the encoded data and storing the encoded data.

21. An apparatus, comprising:

a host; and a memory device coupled to the host through a controller and configured to:

receive initial data provided by the host through the controller, the initial data including target data and a scramble key, wherein the initial data corresponds to a write operation for the target data;

generate encoded data based on encoding the received target data according to the received scramble key; and store the encoded data.

22. The apparatus of claim 21, wherein the host is configured to dynamically generate the scramble key for the write operation.

23. The apparatus of claim 21, wherein the host is configured to track the scramble key corresponding to the target data.

24. The apparatus of claim 23, wherein the host is configured to track the scramble key according to a memory region corresponding to the write operation.

25. The apparatus of claim 23, wherein:

the memory device is configured to provide the encoded data for a read operation corresponding to the target data; and the host is configured to:

receive the encoded data for the read operation; and recover the target data based on decoding the encoded data according to the tracked scramble key.

* * * * *